United States Patent
Yasui

(10) Patent No.: US 11,665,539 B2
(45) Date of Patent: May 30, 2023

(54) COMMUNICATION SYSTEM

(71) Applicant: HITACHI KOKUSAI ELECTRIC INC., Tokyo (JP)

(72) Inventor: Satoru Yasui, Tokyo (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 39 days.

(21) Appl. No.: 17/593,215

(22) PCT Filed: Mar. 18, 2019

(86) PCT No.: PCT/JP2019/011098
§ 371 (c)(1),
(2) Date: Sep. 13, 2021

(87) PCT Pub. No.: WO2020/188679
PCT Pub. Date: Sep. 24, 2020

(65) Prior Publication Data
US 2022/0167156 A1 May 26, 2022

(51) Int. Cl.
| | |
|---|---|
| *H04L 9/32* | (2006.01) |
| *H04W 12/04* | (2021.01) |
| *H04W 12/03* | (2021.01) |
| *H04L 9/08* | (2006.01) |
| *H04L 9/14* | (2006.01) |

(52) U.S. Cl.
CPC ........... *H04W 12/04* (2013.01); *H04L 9/0869* (2013.01); *H04L 9/14* (2013.01); *H04W 12/03* (2021.01)

(58) Field of Classification Search
CPC ........ H04W 12/04; H04W 12/03; H04L 9/14; H04L 9/0869

USPC ......................................................... 713/168
See application file for complete search history.

(56) References Cited

U.S. PATENT DOCUMENTS

| | | | | |
|---|---|---|---|---|
| 2004/0228492 | A1* | 11/2004 | Park | H04L 9/083 380/277 |
| 2009/0268909 | A1 | 10/2009 | Girao et al. | |
| 2015/0281116 | A1* | 10/2015 | Ko | H04L 9/3271 709/227 |

(Continued)

FOREIGN PATENT DOCUMENTS

| | | |
|---|---|---|
| JP | 2003220263 A | 8/2003 |
| JP | 2009540709 A | 11/2009 |
| JP | 2016201605 A | 12/2016 |

(Continued)

OTHER PUBLICATIONS

ISR issued in PCT/JP2019/011098, dated Jun. 18, 2019.

*Primary Examiner* — Jeffrey C Pwu
*Assistant Examiner* — Samuel Ambaye
(74) *Attorney, Agent, or Firm* — Greer Burns & Crain Ltd.

(57) ABSTRACT

A public key of a sensor node key pair is transmitted from a sensor node 22 to a server 20 via sensor network communication, and furthermore is transmitted from the server 20 to a mobile terminal 25 via mobile line communication. In addition, a public key of a mobile terminal key pair is transmitted from the mobile terminal 25 to the sensor node 22 through local communication. Thus, the configuration allows the sensor node 22 and the mobile terminal 25 to generate a common key by combining their own private key and the public key of the counterpart in order to encrypt the local communication by using this common key.

8 Claims, 7 Drawing Sheets

(56) References Cited

U.S. PATENT DOCUMENTS

2018/0129835 A1   5/2018  Mizuno
2019/0089546 A1*  3/2019  Garcia Morchon .... H04L 9/083

FOREIGN PATENT DOCUMENTS

JP    2016213722 A   12/2016
JP    2018152796 A    9/2018

* cited by examiner

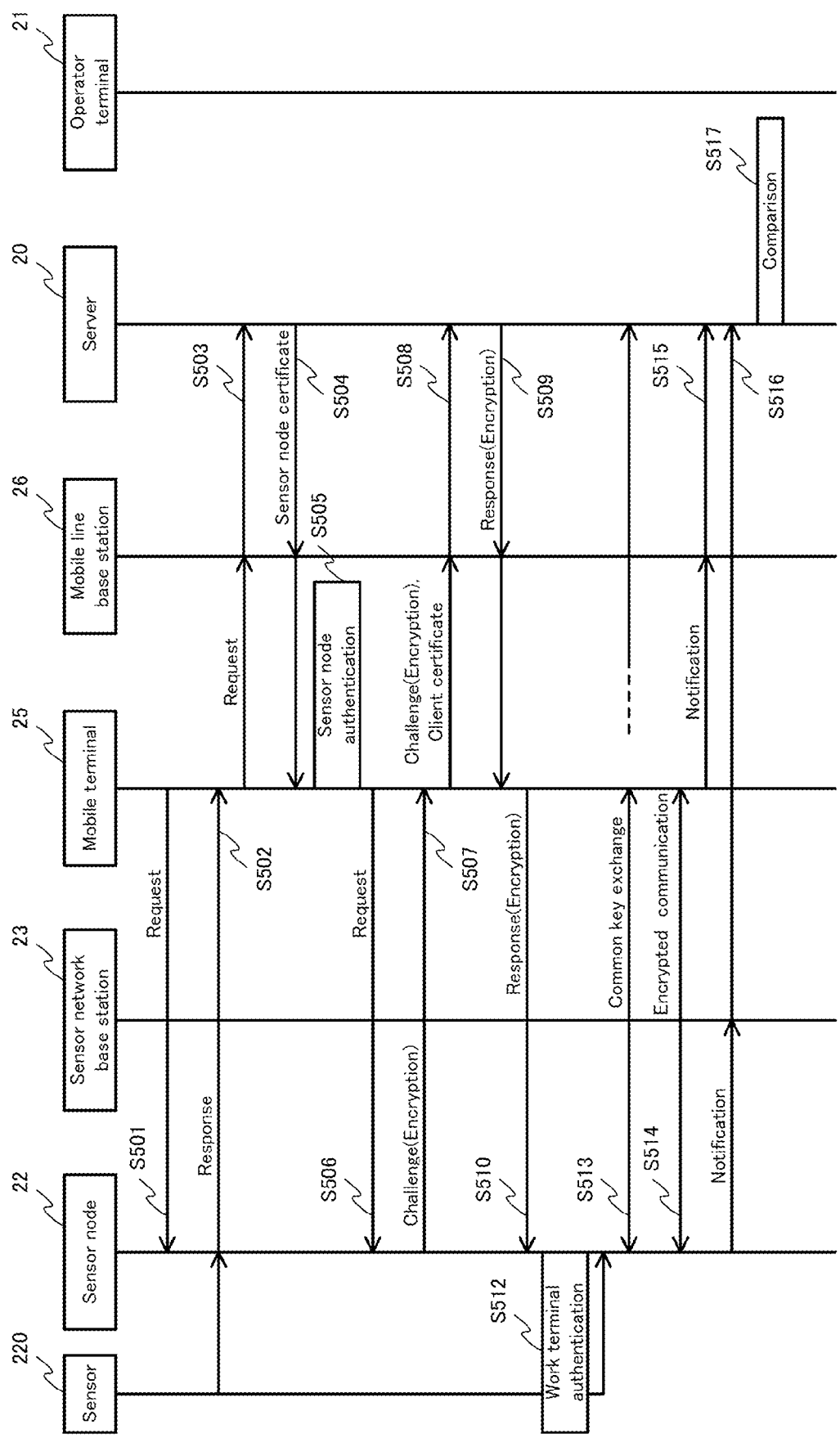

COMMUNICATION SYSTEM

TECHNICAL FIELD

The present invention relates to a communication system for the IoT (Internet of Things) where all devices are connected to the Internet.

BACKGROUND ART

Communication systems for the IoT are formed in such a manner that devices are arranged as end nodes of a network having gateways (Internet gateways), for example, in order to connect the devices to the Internet. Typical examples of such networks include a sensor network. For example, Patent Literature 1 discloses a sensor network where sensor information collected from a plurality of sensors is transmitted to a data collection server through a gateway.

The main purpose of the sensor network is to carry out uplink communication from a sensor node (end node) to a gateway in order to transmit the sensing data of the sensor node to the server for storing and analyzing data. Therefore, in many cases, communication bands are secured for uplink communication with priority over downlink communication.

The conventional IoT communication system is described in reference to FIG. 1.

FIG. 1 is a schematic diagram showing the IoT communication system according to the prior art, and illustrates a configuration where a sensor network is used. The system in FIG. 1 has a server 10 and an operator terminal 11 on the Internet or in a place of business. In addition, sensor nodes 12, a sensor network base station 13 and a gateway 14 are provided in the sensor network.

A sensor group 120 for sensing the temperature, the light, the pressure and the like is connected to the sensor nodes 12. The sensing data obtained from the sensor group 120 is transmitted to the server 10 via the sensor network communication so as to be stored and analyzed by the server 10.

PRIOR ART LITERATURE

Patent Literature

Patent Literature 1: JP2016-201605A

SUMMARY OF THE INVENTION

Problems to be Solved

In the sensor network, uplink communication is prioritized over downlink communication, and therefore, such a problem arises that it is difficult to download a large volume of data from the gateway 14 to a sensor node 12. In addition, there are some cases where reliability is not secured for the sensor network in terms of data reachability, and thus, the sensor network is not appropriate for the exchange of data that requires reliability such as that of data to be updated for the firmware of a sensor node 12. Therefore, the exchange of data that requires reliability is carried out by a worker who visits the site (the place where a sensor node 12 is installed) with a mobile terminal 15 with them so as to connect the mobile terminal 15 and the sensor node 12 to each other through local communication.

In order to secure the security for the local communication, however, it is necessary to lock the communication port with a physical key, or it is necessary to verify the worker and the mobile terminal 15 through ID/password authentication or biometric authentication. This is not a significant problem in the case where the number of sensor nodes 12 is small; however, in a large-scale system having sensor nodes 12 of which the number exceeds 1,000, tasks such as the management of physical keys or registration and management of information that is used for the authentications of the worker and the mobile terminal 15 become a burden for operating the system.

The present invention is provided in view of the above-described conventional state, and an object thereof is to provide a communication system where it is possible to efficiently and safely carry out local communication between a mobile terminal and a sensor node.

Solution to Problems

In order to achieve the above-described object, the communication system according to the present invention is formed as follows.

That is to say, the communication system is provided with a sensor node that acquires sensing data from a sensor and a server that is connected to the sensor node via sensor network communication, and characterized in that the communication system further comprises a mobile terminal that is connected to the server via mobile line communication and can be connected to the sensor node through local communication, the mobile terminal has a mobile terminal key pair, which is a pair of a private key of itself and a public key, the sensor node has a sensor node key pair, which is a pair of a private key of itself and a public key, the public key of the sensor node key pair is transmitted from the sensor node to the server via the sensor network communication, and furthermore is transmitted from the server to the mobile terminal via the mobile line communication, the public key of the mobile terminal key pair is transmitted from the mobile terminal to the sensor node through the local communication, and the sensor node and the mobile terminal generate a common key by combining the private key of itself and the public key of the counterpart so as to encrypt the local communication by using the common key.

Here, the communication system may be formed such that the mobile terminal further has a first encryption key, the sensor node further has a second encryption key with which it is possible to decode data that has been encrypted by using the first encryption key, and the public key of the mobile terminal key pair is encrypted in the mobile terminal by using the first encryption key, transmitted from the mobile terminal to the sensor node through the local communication, and can be decoded in the sensor node by using the second encryption key.

Furthermore, the communication system may be formed such that the sensor node is provided with a random number generator that generates a random number on the basis of the sensing data so as to generate the sensor node key pair by using the random number that has been generated by the random number generator for each session of the local communication.

Moreover, the communication system may be formed such that the sensor node calculates a hash value of the data that has been received through the encrypted local communication and transmits the hash value to the server through the sensor network communication, and the server verifies the correctness of the data on the basis of the hash value that has been received from the sensor node.

In addition, the communication system may be formed such that the sensor node has a key pair for sensor node authentication, which is a pair of a private key for authenticating itself and a public key, the server has a sensor node certificate which is a certificate issued for the public key of the key pair for sensor node authentication, and the mobile terminal receives the sensor node certificate from the server via the mobile line communication when starting the local communication with the sensor node, confirms the correctness and validity of the sensor node certificate by means of a root certificate of itself, and continues the local communication with the sensor node in the case where the sensor node certificate is correct and valid.

Furthermore, the communication system may be formed such that the mobile terminal transmits a connection request to the sensor node through the local communication, the sensor node generates a challenge code in response to the connection request, the challenge code is transmitted from the sensor node to the mobile terminal through the local communication, and further transmitted from the mobile terminal to the server via the mobile line communication, the server generates a response code that corresponds to the received challenge code, the response code is transmitted from the server to the mobile terminal via the mobile line communication, and further transmitted from the mobile terminal to the sensor node through the local communication, and the sensor node confirms the response code that has been generated by the server in response to the challenge code and continues the local communication with the mobile terminal in the case where the response code is appropriate.

Moreover, the communication system may be formed such that the sensor node further has a third encryption key, the server further has a fourth encryption key with which it is possible to decode the data that has been encrypted by using the third encryption key, and the challenge code is encrypted in the sensor node by using the third encryption key, transmitted from the sensor node to the mobile terminal through the local communication, and furthermore, transmitted from the mobile terminal to the server via the mobile line communication and decoded in the server by using the fourth encryption key.

In addition, the communication system may be formed such that the sensor node further has a fifth encryption key and a sixth encryption key with which it is possible to decode the data that has been encrypted by using the fifth encryption key, the fifth encryption key is encrypted in the sensor node by using the third encryption key together with the challenge code, transmitted from the sensor node to the mobile terminal through the local communication, and furthermore, transmitted from the mobile terminal to the server via the mobile line communication, and decoded in the server by using the fourth encryption key, and the response code is encrypted in the server by using the fifth encryption key, transmitted from the server to the mobile terminal via the mobile line communication, and furthermore, transmitted from the mobile terminal to the sensor node through the local communication, and decoded in the sensor node by using the sixth encryption key.

Furthermore, the communication system may be formed such that the sensor node is provided with a random number generator that generates a random number on the basis of the sensing data so as to generate the challenge code by using the random number that has been generated by the random number generator for each session of the local communication.

Advantageous Effects of the Invention

The present invention can provide a communication system where it is possible to carry out local communication between a mobile terminal and a sensor node efficiently and safely.

BRIEF DESCRIPTION OF DRAWINGS

FIG. 7 is a diagram that sequentially illustrates Example 7 of the present invention.

DESCRIPTION OF EMBODIMENTS

The IoT communication system according to one embodiment of the present invention is described in reference to the drawings.

Figure 1:
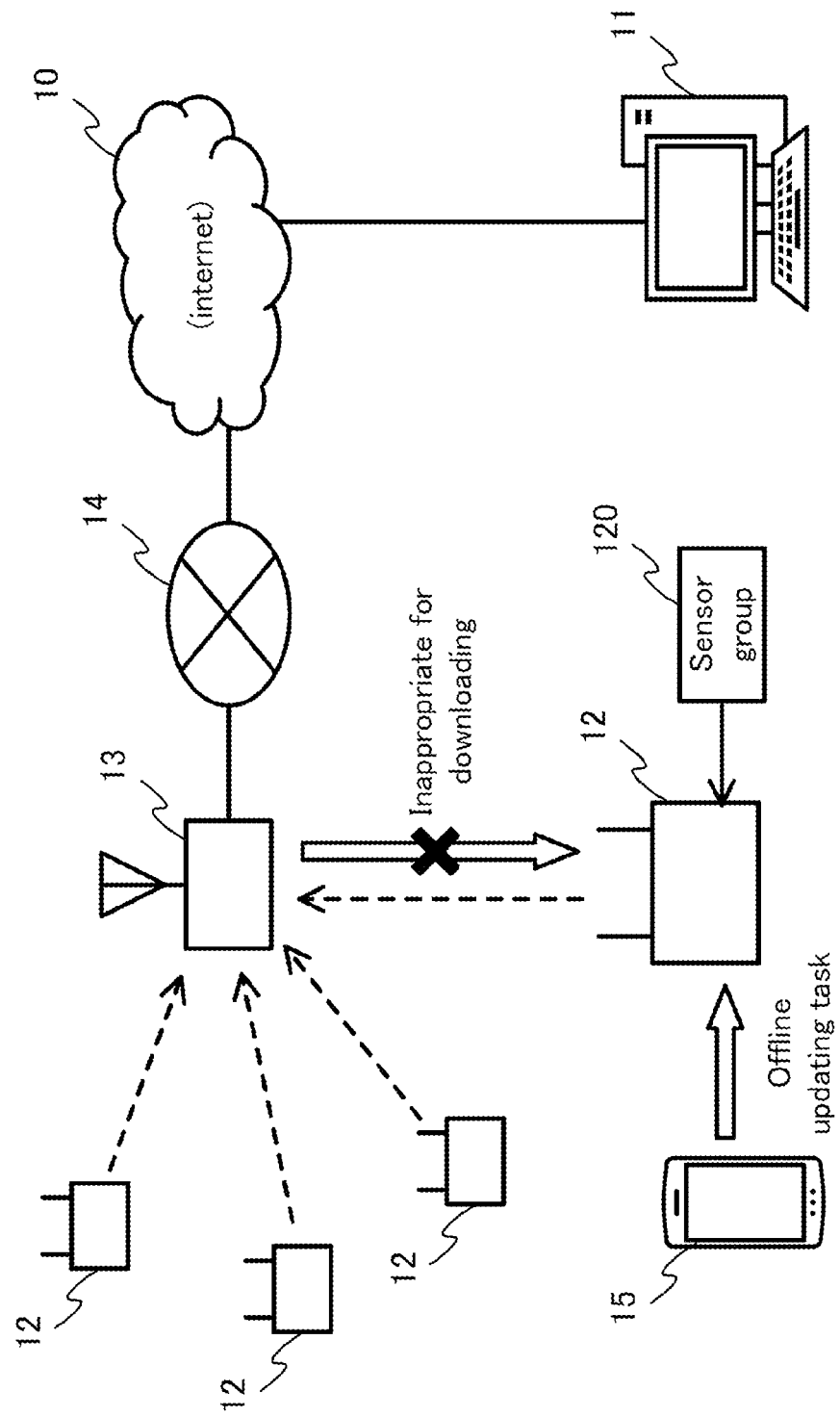
FIG. 1 is a schematic diagram showing the IoT communication system according to the prior art.
Figure 2:
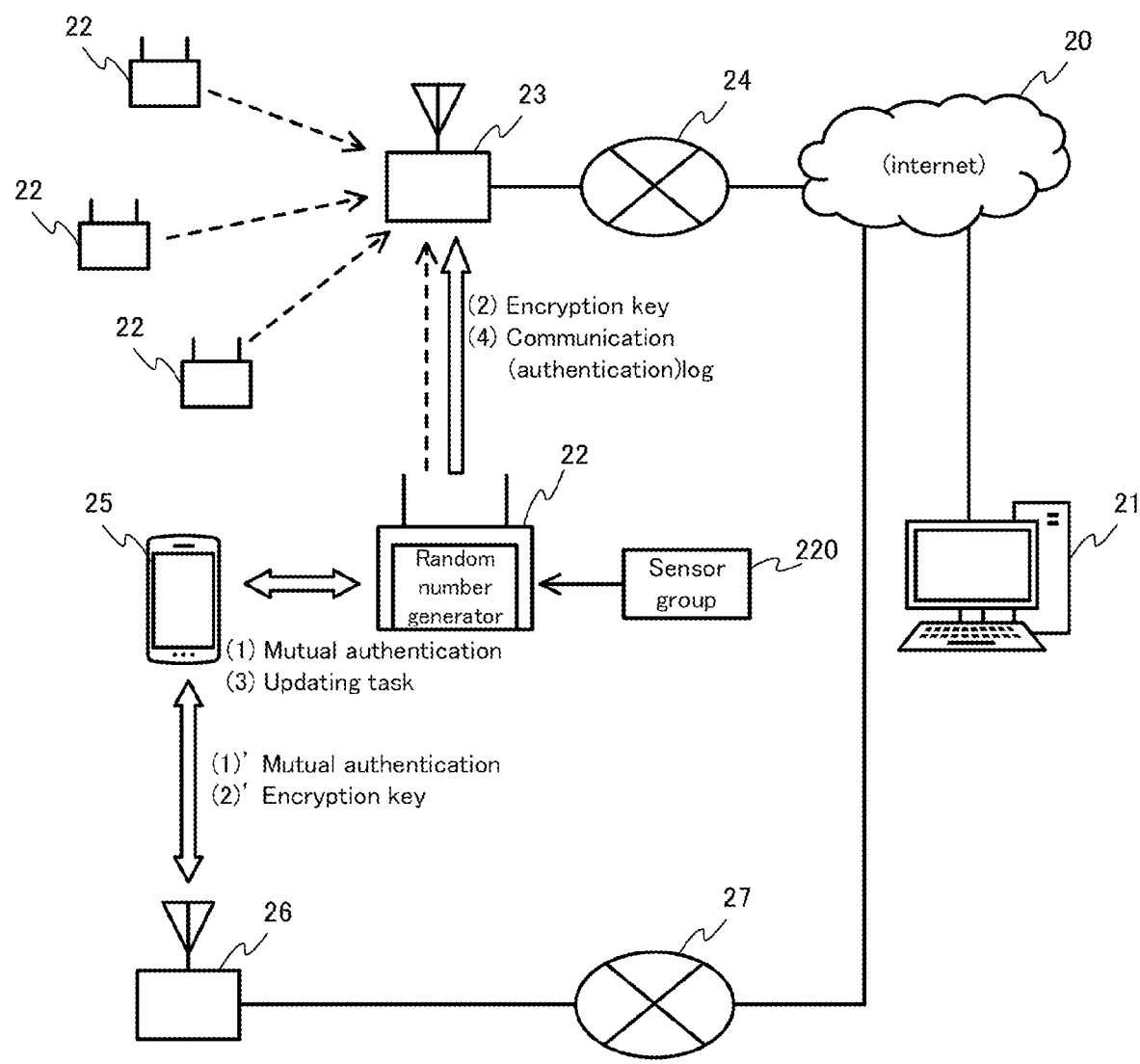
FIG. 2 is a schematic diagram showing the IoT communication system according to one embodiment of the present invention.

FIG. 2 is a schematic diagram showing the IoT communication system according to one embodiment of the present invention, and illustrates a configuration where a sensor network is used. The system in FIG. 2 has a server 20 and an operator terminal 21 on the Internet or in a place of business. In addition, sensor nodes 22, a sensor network base station 23 and a gateway 24 are provided in the sensor network. Furthermore, a mobile terminal 25, a mobile line base station 26 and a gateway 27 are provided along the mobile line.

A sensor group 220 for sensing the temperature, light, pressure and the like is connected to the sensor nodes 22. The sensing data that has been obtained by the sensor group 220 is transmitted to the server 20 via sensor network communication so as to be stored and analyzed by the server 20. The mobile terminal 25 is carried by a worker who visits the site (the place where a sensor node 22 is installed) so as to be used to set various types of data (firmware data to be updated, for example) in the sensor node 22 through the local communication with the sensor node 22. The mobile terminal 25 is also used to exchange data with the server 20 via mobile line communication.

In the IoT communication system of the present example, mobile line communication between the mobile terminal 25 and the server 20 is used in order to make it possible to carry out local communication between the mobile terminal 25 and the sensor node 22 efficiently and safely. Here, the "efficiently" means "to make a physical key for the port of local communication unnecessary," "to collectively carry out the registration and management of the worker and the mobile terminal not in the sensor node but in the server," "to implement safe communication while controlling the sensor network communication for downloading data to the sensor node to a low capacity and a low frequency," or the like. In addition, the "safety" means the intentions at the time of the download of data into the sensor node of "making wiretapping of the key exchange for encrypted communication difficult," "quickly detecting the download of illegal data into the sensor node," "allowing the mobile terminal to verify the sensor node," "allowing the sensor node to verify the mobile terminal," and "allowing the server to verify the mobile terminal."

In the following, the operation of the IoT communication system in the present embodiment is described by using examples.

Example 1

Figure 3:
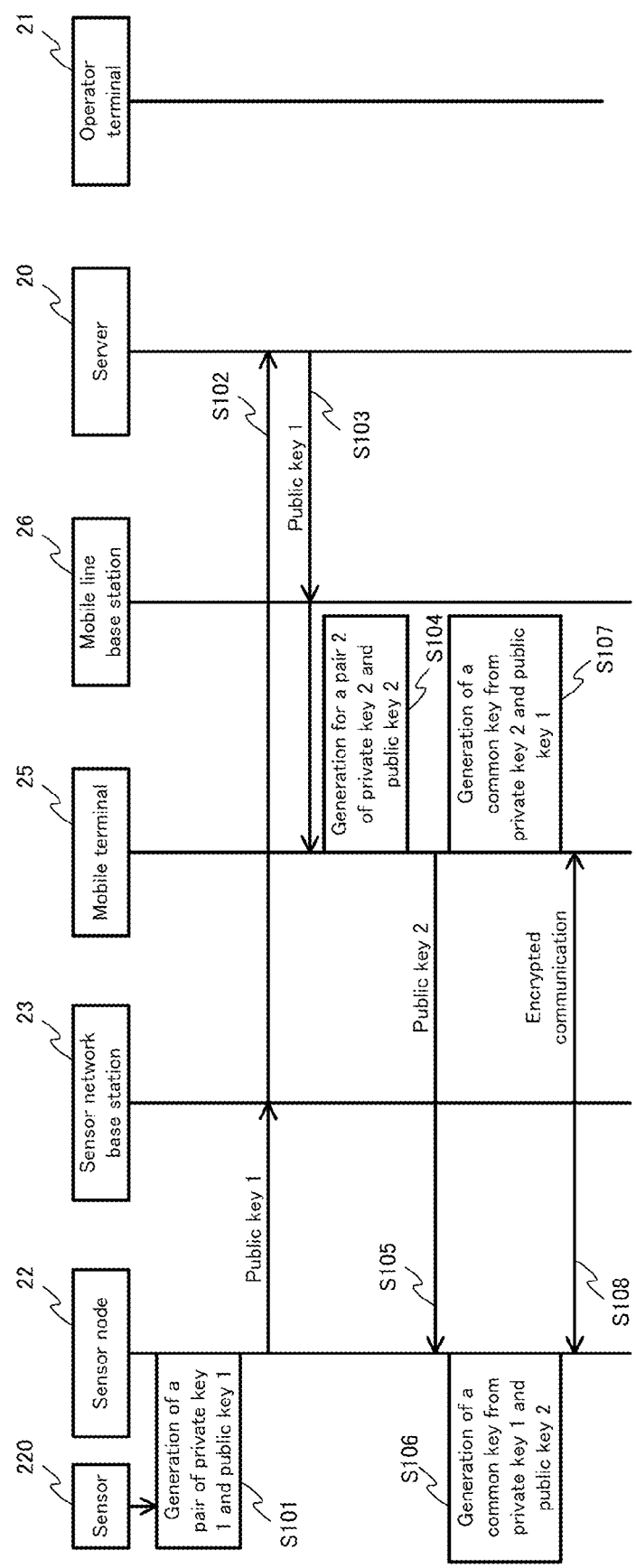
FIG. 3 is a diagram that sequentially illustrates Example 1 and Example 2 of the present invention.

Example 1 of the present invention is described in reference to the sequence diagram in FIG. 3. Example 1 corresponds to a part of the sequence in FIG. 3.

In Example 1, first, a sensor node 22 generates a sensor node key pair, which is a pair of a private key of its own and a public key (step S101). The sensor node 22 may have generated the sensor node key pair in advance. The public key of the sensor node key pair is transmitted from the sensor node 22 to the server 20 via sensor network communication (step S102), and furthermore is transmitted from the server 20 to the mobile terminal 25 via mobile line communication (step S103).

In addition, the mobile terminal 25 generates a mobile terminal key pair, which is a pair of a private key of its own and a public key (step S104). The mobile terminal 25 may have generated the mobile terminal key pair in advance. The public key of the mobile terminal key pair is transmitted from the mobile terminal 25 to the sensor node 22 through local communication (step S105). Before transmitting the public key of the mobile terminal key pair, the mobile terminal 25 may encrypt the public key with the public key included in a sensor node certificate, which is a certificate that has been issued to the sensor node 22 by a CA (Certification Authority) that is a third-party institution, in the case where the mobile terminal 25 has such a sensor node certificate.

Next, the sensor node 22 and the mobile terminal 25 generate a common key by combining their own private key and the public key of the counterpart (steps S106 and S107). That is to say, the sensor node 22 generates a common key by combining the private key of the sensor node key pair and the public key of the mobile terminal key pair, whereas the mobile terminal 25 generates a common key by combing the private key of the mobile terminal key pair and the public key of the sensor node key pair. This combination method may include the use of a publicly-known key sharing system such as DH (Diffie-Hellman key exchange). In the case where the public key of the mobile terminal key pair is encrypted with the public key of a sensor node certificate, the mobile terminal 25 may decode the public key by using the private key that forms the pair with the public key of the sensor node certificate.

Thus, the sensor node 22 and the mobile terminal 25 use the common key that has been generated as described above in order to encrypt the following local communication (step S108).

As described above in Example 1, the public key of the sensor node key pair is transmitted from the sensor node 22 to the server 20 via sensor network communication, and furthermore is transmitted from the server 20 to the mobile terminal 25 via mobile line communication. In addition, the public key of the mobile terminal key pair is transmitted from the mobile terminal 25 to the sensor node 22 through local communication. Thus, the configuration allows the sensor node 22 and the mobile terminal 25 to generate a common key by combining their own private key and the public key of the counterpart in order to encrypt the local communication by using this common key.

As described above, the server 20 is intervened in the transmission of the public key of the mobile terminal key pair from the sensor node 22 to the mobile terminal 25 in order to prevent the mobile terminal 25 from obtaining the public key of the sensor node key pair, unless the mobile terminal 25 can be connected to the server 20. Accordingly, the public key of the sensor node key pair that can be used for the encryption of local communication can be prevented from being obtained by an ill-willed person. In addition, the number of times of local communication before the completion of key exchange can be reduced by one, and therefore, the safety of communication can be enhanced.

In the case where the public key of the mobile terminal key pair is encrypted before being transmitted, all of the local communication that includes those before the completion of the key exchange can be encrypted. As a result, wiretapping of the key exchange for the encrypted communication can be made difficult. In Example 1, the mobile terminal 25 encrypts the public key of the mobile terminal key pair with the public key (first encryption key) that is included in a sensor node certificate, and the sensor node 22 decodes the public key with the private key (second encryption key) that forms the pair with the public key of the sensor node certificate. Though the example is described this way, the first and second encryption keys are not limited to these.

In an example, the sensor node 22 may have generated a sensor node key pair for key exchange separately from the above-described sensor node key pair so that the public key of the sensor node key pair for key exchange can be used as the first encryption key, and the private key of the sensor node key pair for key exchange can be used as the second encryption key. In this case, the public key (first encryption key) of the sensor node key pair for key exchange may be transmitted together with the public key of the sensor node key pair when the public key of the sensor node key pair is transmitted to the mobile terminal 25 through the server 20.

In another example, the sensor node 22 may hold a common key for key exchange (common key in a system for key sharing in advance), which can be used as the first encryption key or the second encryption key. In this case, the common key for key exchange (first encryption key) may be transmitted together with the public key of the sensor node key pair when the public key of the sensor node key pair is transmitted to the mobile terminal 25 through the server 20.

Example 2

Example 2 of the present invention is described in reference to the sequence diagram in FIG. 3. Example 2 corresponds to a part of the sequence in FIG. 3.

In Example 2, the sensor node 22 generates a random number that becomes the private key of the sensor node key pair by processing the sensing data in the sensor group 220 when the sensor node key pair is generated in step S101 in Example 1. It is possible to use various types of random number generators in order to generate a random number on the basis of the sensing data. For example, a random number generator can be used where sensing data can be sampled with a time interval with which the probability of the sensing data changing timewise is approximately 0.5, that is to say, a time interval between a time interval with which the probability of the sensing data changing timewise is approximately 0, and a time interval with which the probability thereof is approximately 1, and thus, a bit series (random number) where a change point (in the case where the value has changed from that in the previous sampling point in time) is "1" and a non-change point (in the case where the value has not changed from that in the previous sampling point in time) is "0" is generated. In addition, the random number generator may generate a random number in response to physical information (sensing data gained in the sensor group 220) in accordance with another publicly-known random number generating system where the probability of generating the bit "1" and the bit "0" is the same.

The sensor node 22 uses the random number that has been generated by a random number generator such as the one described above so as to generate a sensor node key pair for each session of local communication. Accordingly, the sensor node 22 can generate a sensor node key pair on the basis of a genuine random number in correspondence with sensing data in the sensor group 220.

As described above in Example 2, the sensor node 22 is provided with a random number generator that generates a random number on the basis of sensing data, and thus, the configuration allows the sensor node 22 to use the random number generated by the random number generator in order to generate a sensor node key pair for each session of local communication.

Thus, a random number is generated by processing the sensing data gained in the sensor group 220 so as to be used for the generation of a sensor node key pair. As a result, it is not necessary to additionally provide another physical device or mechanism in order to generate a random number. Accordingly, it is possible to generate a genuine random number while preventing the cost from increasing. In addition, a sensor node key pair is generated for each session of local communication by using a random number that corresponds to the sensing data at that point in time, and therefore, wiretapping of the encrypted communication other than that session can be made difficult even if the public key of the sensor node key pair has been stolen.

Example 3

Figure 4:
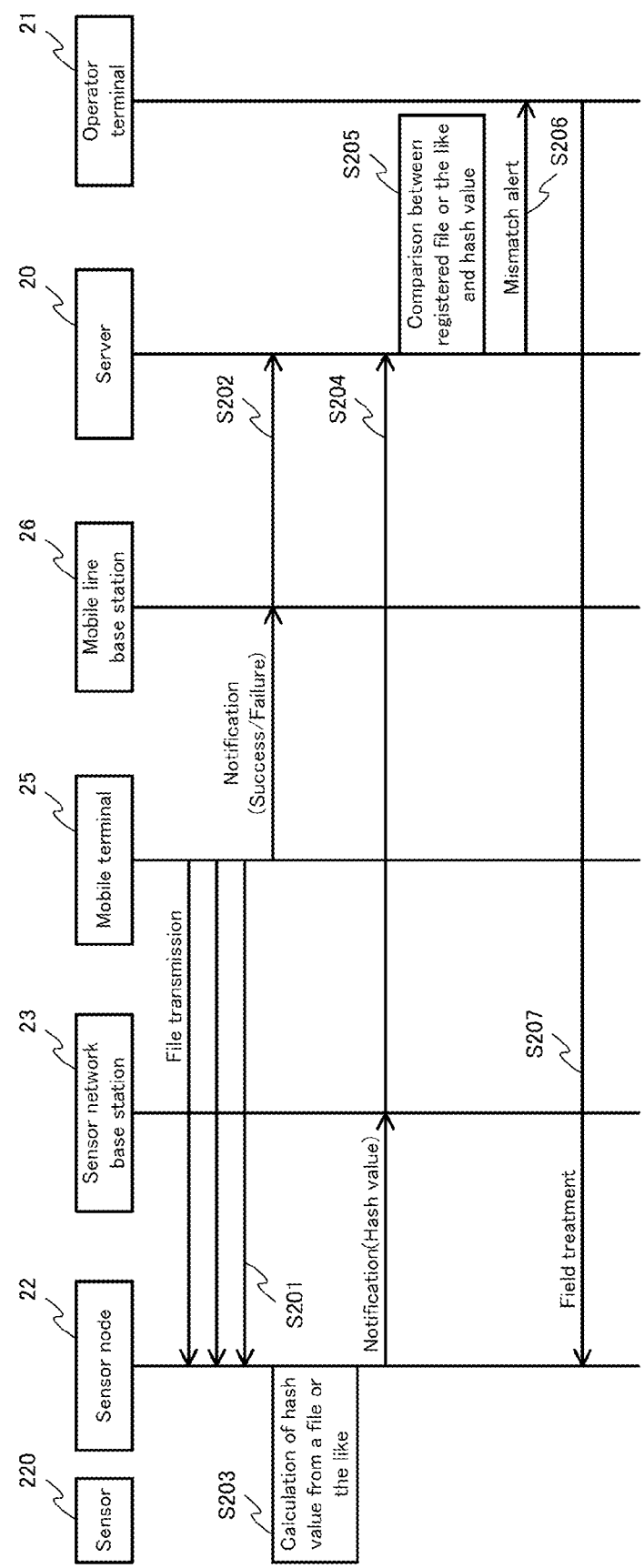
FIG. 4 is a diagram that sequentially illustrates Example 3 of the present invention.

Example 3 of the present invention is described in reference to the sequence diagram in FIG. 4.

After a mobile terminal 25 has carried out key exchange in accordance with the sequence in FIG. 3, a file is transmitted to a sensor node 22 through encrypted local communication (step S201). After that, the mobile terminal 25 notifies a server 20 of the results of the file transmission via mobile line communication (step S202). A publicly-known protocol having reliability in terms of data reachability such as a TCP (Transmission Control Protocol) may be used for the transmission of the file. In this case, the mobile terminal 25 may notify the server 20 of the success or failure of the file transmission as the results thereof. In addition, a publicly-known protocol having no reliability in terms of data reachability such as a UDP (User Datagram Protocol) may be used for the transmission of the file. In this case, the mobile terminal 25 may notify the server 20 of the completion of unilateral file transmission instead of notifying the server 20 of the success or failure of the file transmission as the results thereof.

Upon the reception of the file from the mobile terminal 25, the sensor node 22 calculates the hash value of the file (step S203). A publicly-known algorithm such as SHA-2 (Secure Hash Algorithm 2) can be used for the calculation of the hash value. In addition, the file to which accompanying information has been added may be used as an input for the calculation of the hash value. As the accompanying information added to the file, various types of information that relate to the file such as the mobile terminal ID for identifying the mobile terminal 25, the sensor node ID for identifying the sensor node 22, the sequential number that indicates the version of the file, and the period of validity of the file before and after being updated can be used. The sensor node 22 notifies the server 20 of the calculated hash value via sensor network communication (step S204).

The server 20 compares the hash value that has been notified from the sensor node 22 with the hash value of the file that has been calculated in advance and registered, and verifies the correctness of the file that has been transmitted to the sensor node 22 (step S205). In the case where the hash values are inconsistent, the server 20 issues an inconsistency alert to an operator terminal 21 (step S206). The input used for the calculation of the hash value on the server 20 side is made to be the same as the input used for the calculation of the hash value on the sensor node 22 so as to make the conditions for the calculation of the hash value the same. The hash value that is registered in the server 20 in advance may have been calculated in the mobile terminal 25 and transmitted to the server 20. The inconsistency alert may include the results of comparison between the notification concerning the file transmission by the mobile terminal 25 and the notification (hash value) from the sensor node 22.

The operator for operating the operator terminal 21 carries out field treatment (step S207). The field treatment may be carried out by a worker who has the mobile terminal 25 with him that can be reached to the corresponding sensor node 22 at the earliest. In addition, a communication protocol having reliability in terms of data reachability may be used only once via sensor network communication that includes a downlink in order to remotely control the corresponding sensor node 22. Concretely, a control signal of a small amount (several bytes, for example) such as a control signal for transmitting the log of the file transmission to the server 20 from the sensor node 22 and a control signal for stopping the functions that include the starting-up of the device in the sensor node 22 may be transmitted from the server 20 to the sensor node 22.

As described above in Example 3, the sensor node 22 calculates the hash value of the data that has been received through encrypted local communication, and transmits the calculated hash value to the server 20 through sensor network communication. In addition, the configuration allows the server 20 to verify the correctness of the data that has been received by the sensor node 22 on the basis of the hash value that has been received from the sensor node 22.

Such a configuration can allow the server 20 to detect the file transmission to the sensor node 22 through local communication, and at the same time verify the correctness of the file. Accordingly, illegal file transmission to the sensor node 22 can be detected without the sensor network communication from the server 20 to the sensor node 22 being downlinked. It is also possible to deal with the updating of an ill-willed firmware quickly (several seconds to several tens of minutes, for example). Here, it is possible to deal with such updating with much lower delay in the case where the sensor network controls the information within the network at all times; however, the sensor network is not such a system Example 4

Figure 5:
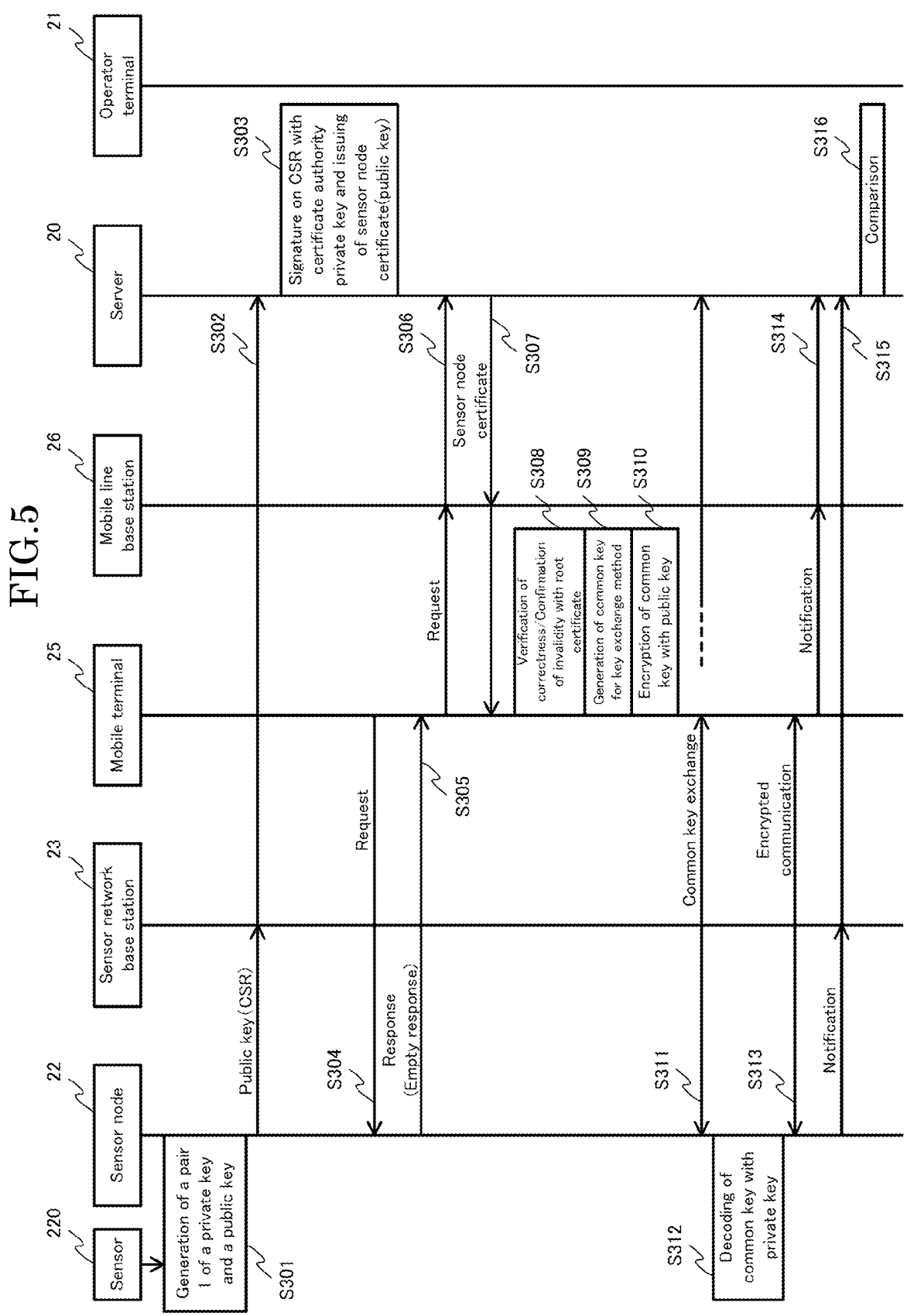
FIG. 5 is a diagram that sequentially illustrates Example 4 of the present invention.

Example 4 of the present invention is described in reference to the sequence diagram in FIG. 5.

In Example 4, first, a sensor node 22 generates a key pair for sensor node authentication, which is a pair of a private key for authenticating itself and a public key (step S301). In addition, the sensor node 22 transmits a CSR (Certificate Signing Request) for applying the issue of a sensor node certificate, which is a certificate for the public key of the key pair for sensor node authentication, to a server 20 via sensor network communication (step S302).

Upon the reception of a CSR from the sensor node 22, the server 20 issues a sensor node certificate for the public key of the key pair for sensor node authentication (step S303). The sensor node certificate is issued through the signature on the CSR with the private key of the certificate authority (CA). The certificate authority may be the server 20 or may be a third institute that is different from the server 20. In the case where the users of the sensor node certificate are limited such as the case where the users are limited to the organizations that built the sensor network, any of these organizations may be the certificate authority; however, it is necessary to verify the below-described sensor node certificate.

The key pair for sensor node authentication may be generated at the time when the sensor node 22 is shipped from the factory, or may be generated at the time when the sensor node 22 is started up for the first time after being installed in the site. In the case where the key pair for sensor node authentication is generated after the installation in the site, the public key of the sensor node key pair may be transmitted from the sensor node 22 to the server 20 via the sensor network.

Next, the mobile terminal 25 transmits a connection request to the sensor node 22 through local communication so as to try to access the sensor node 22 (step S304). In response to this, the sensor node 22 returns an arbitrary response that includes the sensor node ID for identifying the sensor node 22 to the mobile terminal 25 (step S305). Upon the reception of the response from the sensor node 22, the mobile terminal 25 requests the server 20 to transmit the sensor node certificate of the sensor node 22 that is identified with the sensor node ID included in the response (step S306). The server 20 follows the request from the mobile terminal 25 so as to transmit the corresponding sensor node certificate to the mobile terminal 25 via sensor network communication (step S307).

Next, the mobile terminal 25 confirms the correctness and validity of the sensor node certificate that has been received from the server 20 (step S308). The correctness of the sensor node certificate can be confirmed by using a root certificate that has been installed in the mobile terminal 25 in advance. The validity of the sensor node certificate can be confirmed by using the period of validity of the sensor node certificate and the certificate revocation list (CRL).

In the case where the sensor node certificate is correct and valid, and thus, the authentication of the sensor node 22 is successful, the mobile terminal 25 continues local communication with the sensor node 22. In the other case where the authentication of the sensor node 22 fails, local communication with the sensor node 22 is terminated. In the following, the operation in the case where the authentication of the sensor node 22 is successful (in the case where local communication with the sensor node 22 is continued) is described.

In Example 4, the mobile terminal 25 generates a common key that is used for the encryption of local communication (step S309). The mobile terminal 25 encrypts the generated common key by using the public key that is included in the sensor node certificate (step S310) and transmits the encrypted common key to the sensor node 22 through local communication (step S311). The sensor node 22 decodes the common key that has been received from the mobile terminal 25 with the private key of the key pair for sensor node authentication (step S312).

After that, the sensor node 22 and the mobile terminal 25 use the above-described common key in order to encrypt the following local communication (step S313).

After the transmission of a file from the mobile terminal 25 to the sensor node 22, as described in Example 3, the mobile terminal 25 notifies the server 20 of the results of the file transmission (step S314), and the sensor node 22 notifies the server 20 of the hash value of the file (step S315). After that, the hash value that has been notified by the sensor node 22 and the hash value in the file that has been calculated in advance and registered are compared so as to verify the correctness of the file that has been transmitted to the sensor node 22 (step S316).

As described above, the configuration in Example 4 allows the mobile terminal 25 to receive the sensor node certificate from the server 20 via mobile line communication at the time when local communication with the sensor node 22 is started, to confirm the correctness and the validity of the sensor node certificate with its own root certificate, and to continue the local communication with the sensor node 22 in the case where the sensor node certificate is correct and valid.

Thus, the mobile terminal 25 acquires a sensor node certificate from the server 20 so as to verify the sensor node certificate prior to local communication with the sensor node 22, and thereby, the correctness and the validity of the sensor node 22 can be confirmed. Accordingly, it becomes possible to prevent an attack that tries to impersonate the sensor node 22. In addition, key exchange for encrypted communication can be carried out by using the public key of the sensor node certificate, and therefore, it becomes difficult for a third party to decode the encrypted local communication. As a result, wiretapping of the local communication can be prevented.

In the above description, the mobile terminal 25 generates the common key for encrypted communication, encrypts the common key with the public key included in the sensor node certificate, and transmits the common key to the sensor node 22; however, key exchange may be carried out in accordance with the same technique as in Example 1. That is to say, the mobile terminal 25 may encrypt the public key of the mobile terminal key pair with the public key of the sensor node certificate so as to transmit the encrypted public key to the sensor node 22, and thus, the sensor node 22 and the mobile terminal 25 may generate a common key by combining the private key of their own and the public key of their counterpart.

Example 5

Figure 6:
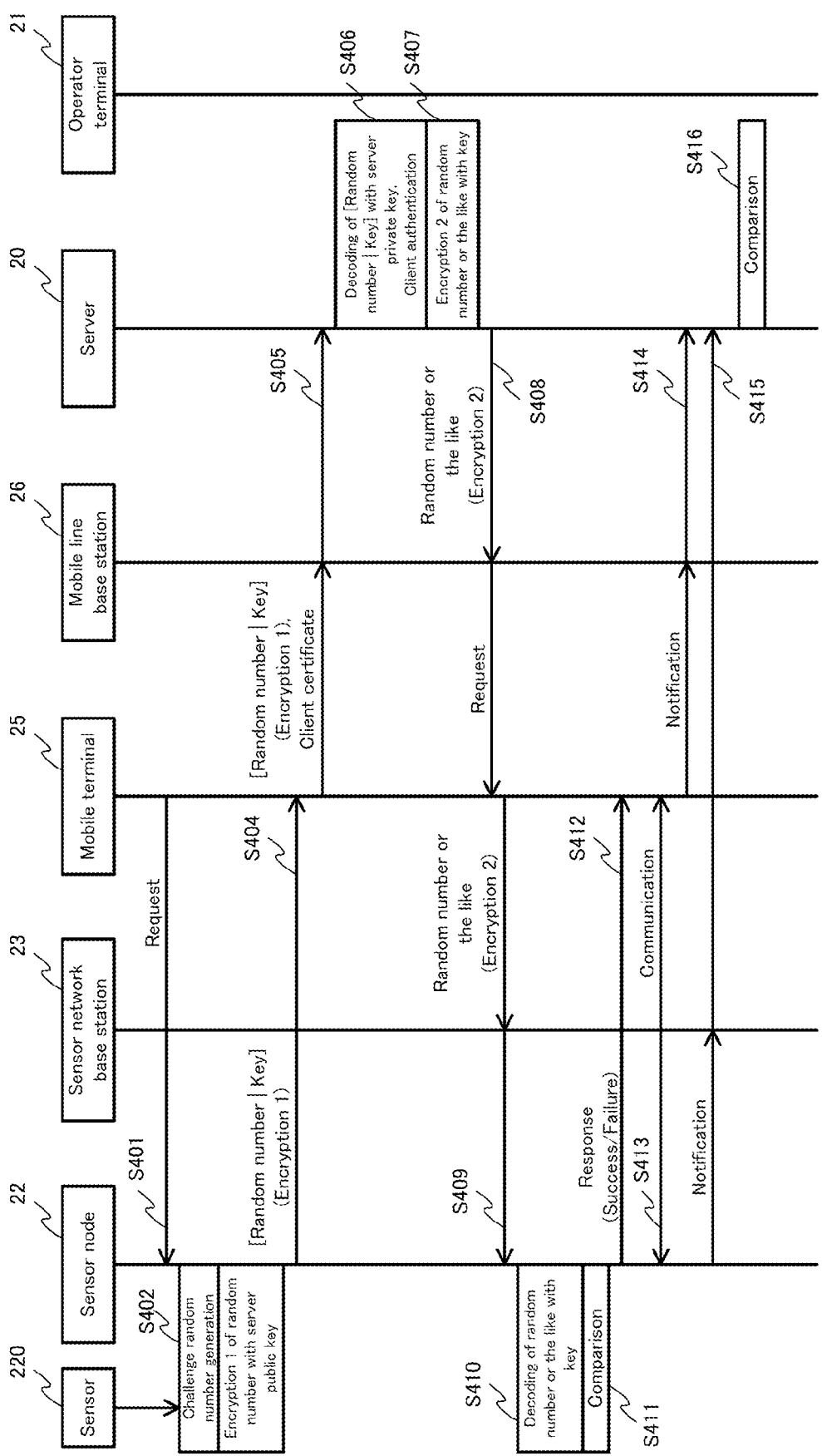
FIG. 6 is a diagram that sequentially illustrates Example 5 and Example 6 of the present invention.

Example 5 of the present invention is described in reference to the sequence diagram in FIG. 6. Example 5 corresponds to a part of the sequence in FIG. 6.

In Example 5, first, a mobile terminal 25 transmits a connection request to a sensor node 22 through local communication, and thus tries to access the sensor node 22 (step S401). In response to this, the sensor node 22 generates a challenge code that is used for the authentication in a challenge response system on the basis of a random number that is generated each time by a random number generator (step S402). In addition, the sensor node 22 encrypts the set of the challenge code and the response encryption key that is later used for the encryption of a response code by the server 20 with the public key of the server key pair, which is a pair of a private key and a public key of the server 20

(step S403). The set of the encrypted challenge code and the encrypted response encryption key is transmitted from the sensor node 22 to the mobile terminal 25 through local communication (step S404).

As for the challenge response system, a publicly-known challenge response system may be used where the hash value of the challenge code that has been found by using a publicly-known algorithm such as SHA-2 is used as the response code. The response encryption key may be the public key in the pair of the private key and the public key of the sensor node 22 or may be the common key shared by the sensor node 22 and the server 20.

Next, the mobile terminal 25 transmits the challenge code together with its own client certificate to the server via mobile line communication (step S405). The client certificate has been issued in advance by the certificate authority, and thus is held by the mobile terminal 25.

Next, the server 20 confirms the correctness and the validity of the client certificate that has been received from the mobile terminal 25 so as to verify the mobile terminal 25, and decodes the encrypted challenge code and the encrypted response encryption key with the private key of the server key pair (step S406). The correctness of the client certificate can be confirmed by using a root certificate that has been installed in the server 20 in advance. The validity of the client certificate can be confirmed by using the period of validity of the client certificate and the certificate revocation list.

Next, the server 20 generates a response code in response to the challenge code in accordance with the challenge response system that is shared with the sensor node 22, and encrypts the response code with a response encryption key (step S407). The encrypted response code is transmitted from the server 20 to the mobile terminal 25 via mobile line communication (step S408), and transmitted from the mobile terminal 25 to the server 20 through local communication (step S409).

Next, the sensor node 22 decodes the encrypted response code with the response encryption key (step S410), and compares the decoded response code with the response code that has been calculated in the sensor node 22 (step S411). After that, the sensor node 22 notifies the mobile terminal 25 of the results of comparison of the response codes through local communication (step S412). Concretely, the sensor node 22 continues the local communication with the mobile terminal 25 in the case where the response codes are the same, and thus, the authentication of the mobile terminal 25 is successful, and stops the local communication with the mobile terminal 25 in the other case where the authentication of the mobile terminal 25 fails.

In the case where the authentication of the mobile terminal 25 is successful (in the case where the local communication with the mobile terminal 25 is continued), the operation is the same as in Example 3. That is to say, a file is transmitted from the mobile terminal 25 to the sensor node 22 (step S413), and after that, the mobile terminal 25 notifies the server 20 of the results of the file transmission (step S414), and the sensor node 22 notifies the server 20 of the hash value of the file (step S415). After that, the hash value that has been notified by the sensor node 22 and the hash value of the file that has been calculated in advance and registered are compared so as to verify the correctness of the file that has been transmitted to the sensor node 22 (step S416). In this case, needless to say, key exchange may be carried out prior to the transmission of the file from the mobile terminal 25 to the sensor node 22 so as to encrypt the local communication.

As described above in Example 5, the mobile terminal 25 transmits a connection request to a sensor node 22 through local communication. The sensor node 22 generates a challenge code in response to the connection request. This challenge code is transmitted from the sensor node 22 to the mobile terminal 25 through local communication, and furthermore transmitted from the mobile terminal 25 to a server 20 via mobile line communication. The server 20 generates a response code in response to the received challenge code. This response code is transmitted from the server 20 to the mobile terminal 25 via mobile line communication, and furthermore transmitted from the mobile terminal 25 to the sensor node 22 through local communication. Then, the sensor node 22 confirms the response code that has been generated in response to the challenge code by the server 20, and thus, the configuration allows the local communication with the mobile terminal 25 to be continued in the case where the response code is appropriate.

Such a configuration can verify whether or not the mobile terminal 25 can return a correct response code as viewed from the sensor node 22, and therefore can allow the sensor node 22 to confirm the correctness of the mobile terminal 25. Accordingly, it becomes possible to prevent an attack that tries to impersonate the mobile terminal 25.

In addition, the configuration in Example 5 allows the challenge code that has been generated by the sensor node 22 to be encrypted in the sensor node 22 by using the public key (third encryption key) of the server key pair, to be transmitted from the sensor node 22 to the mobile terminal 25 through local communication, to be further transmitted from the mobile terminal 25 to the server 20 via mobile line communication, and to be decoded in the server 20 by using the private key (fourth encryption key) of the server key pair.

Furthermore, in Example 5, the response encryption key held by the sensor node 22 is encrypted together with the challenge code in the sensor node 22, transmitted from the sensor node 22 to the mobile terminal 25 through local communication, further transmitted from the mobile terminal 25 to the server 20 via mobile line communication, and decoded in the server 20. Then, the configuration allows the response code that has been generated in the server 20 to be encrypted in the server 20 by using a response encryption key (fifth encryption key), to be transmitted from the server 20 to the mobile terminal 25 via mobile line communication, further transmitted from the mobile terminal 25 to the sensor node 22 through local communication, and decoded in the sensor node 22 by using a response encryption key (sixth encryption key).

As described above, the challenge code and the response code are encrypted before being transmitted, and thus, the challenge code and the response code can be prevented from being wiretapped during the communication. Accordingly, it is made impossible to estimate the generation pattern of the challenge code, and likewise, it is made impossible to estimate the response code, which makes it difficult to impersonate the mobile terminal. Here, the combination of the third encryption key and the fourth encryption key and the combination of the fifth encryption key and the sixth encryption key are merely examples cited in Example 5, and a pair of a private key and a public key or a common key in a system where a key is shared in advance may be used.

Example 6

Example 6 of the present invention is described in reference to the sequence diagram in FIG. 6. Example 6 corresponds to a part of the sequence in FIG. 6.

In Example 6, the sensor node 22 generates a random number that becomes a challenge code by processing sensing data in the sensor group 220 when a challenge code is generated in step S402 in Example 5. In the same manner as in Example 2, it is possible to use various types of random number generators for the generation of a random number on the basis of the sensing data. The sensor node 22 uses a random number that has been generated by a random number generator as described above in order to generate a challenge code in response to a connection request from the mobile terminal 25.

As described above in Example 6, the sensor node 22 is provided with a random number generator that generates a random number on the basis of sensing data, and thus, the configuration allows the sensor node 22 to use the random number generated by the random number generator in order to generate a challenge code for each session of local communication.

Thus, a random number is generated by processing the sensing data gained in the sensor group 220 so as to be used for the generation of a challenge code. As a result, it is not necessary to additionally provide another physical device or mechanism in order to generate a random number. Accordingly, it is possible to generate a genuine random number while preventing the cost from increasing. In addition, a challenge code is generated for each session of local communication by using a random number that corresponds to the sensing data at that point in time, and therefore, wiretapping of the encrypted communication other than that session can be made difficult even if the challenge code has been stolen.

Example 7

Example 7 of the present invention is described in reference to the sequence diagram in FIG. 7.

In Example 7, first, a sensor node 22 is authenticated in the same manner as in Example 4 (steps S501 through S505). Concretely, a mobile terminal 25 transmits a connection request to the sensor node 22 through local communication and tries to access the sensor node 22 (step S501). In response to this, the sensor node 22 returns to the mobile terminal 25 an arbitrary response that includes the sensor node ID for identifying the sensor node 22 (step S502). Upon reception of the response from the sensor node 22, the mobile terminal 25 requests the server 20 to transmit a sensor node certificate for the sensor node 22 that can be identified with the sensor node ID included in this response (step S503). The server 20 follows the request from the mobile terminal 25 so as to transmit the corresponding sensor node certificate to the mobile terminal 25 via sensor network communication (step S504). After that, the mobile terminal 25 confirms the correctness and the validity of the sensor node certificate that has been received from the server 20 (step S505). Thus, the authentication of the sensor node 22 is successful in the case where the sensor node certificate is correct and valid, and the authentication of the sensor node 22 fails otherwise.

In the case where the authentication of the sensor node 22 is successful, the mobile terminal 25 is authenticated in the same manner as in Example 5 and Example 6 (steps S506 through S512). Concretely, the mobile terminal 25 transmits a connection request to the sensor node 22 through local communication so as to try to access the sensor node 22 (step S506). In response to this, the sensor node 22 generates and encrypts a challenge code to be used for the authentication in a challenge response system, and transmits the encrypted challenge code to the mobile terminal 25 through local communication (step S507). Upon reception of the encrypted challenge code from the sensor node 22, the mobile terminal 25 transmits the encrypted challenge code together with its own client certificate to the server via mobile line communication (step S508). The server 20 confirms the correctness and the validity of the client certificate that has been received from the mobile terminal 25, and after that decodes the encrypted challenge code and generates a response code to the challenge code, and thus encrypts the response code. The encrypted response code is transmitted from the server 20 to the mobile terminal 25 via mobile line communication (step S509), and then transmitted from the mobile terminal 25 to the server 20 through local communication (step S510). The sensor node 22 decodes the encrypted response code and compares it with the response code that has been calculated in the sensor node 22 (step S511). Thus, the authentication of the mobile terminal 25 is successful in the case where the response codes are the same, and the authentication of the mobile terminal 25 fails otherwise.

In the case where the authentication of the mobile terminal 25 is also successful, key exchange for encrypting the local communication is carried out in the same manner as in Example 1 and Example 2 (step S513). After that, illegal downloading is detected in the same manner as in Example 3 (steps S514 through S517). Concretely, a file is transmitted from the mobile terminal 25 to the sensor node 22 (step S514), and after that, the mobile terminal 25 notifies the server 20 of the results of the file transmission (step S515), and the sensor node 22 notifies the server 20 of the hash value of the file (step S516). After that, the hash value that has been notified by the sensor node 22 is compared with the hash value of the file that has been calculated in advance and registered in order to verify the correctness of the file that has been transmitted to the sensor node 22 (step S517).

As described above, the configuration in Example 7 carries out sensor node authentication as in Example 4 and mobile terminal authentication as in Examples 5 and 6, and then carries out key exchange as in Examples 1 and 2 in order to verify the transmitted file as in Example 3. Though the sensor node authentication is carried out first and then the mobile terminal authentication is carried out in Example 7, the order of these may be opposite.

In this configuration, it is not necessary to lock the port for the local communication between the sensor node 22 and the mobile terminal 25 with a physical key, or it is not necessary to carry out ID/password authentication or biometric authentication on the worker and the mobile terminal 15. In addition, the sensor node authentication and the mobile terminal authentication can be carried out through one-time uplink communication of the sensor network, and therefore, it is possible to carry out common key exchange safely. Even in the case where the downloading of illegal data into the sensor node 22 is detected by using uplink communication of the sensor network, it is done with two-times uplink communication of the sensor network, and therefore, local communication can be carried out efficiently and safely. In the case where the sensor node authentication or the mobile terminal authentication fails, it is possible to deal with the attacker by means of other communication means without carrying out communication of the sensor network.

The configurations in the above-described examples transmit the data used by the sensor node 22 itself (firmware data to be updated, for example) to the mobile terminal 25 from the sensor node 22 through local communication; however, the present invention is not limited to these. That is to say, it is also possible to apply the present invention in the case where data is transmitted to other devices that are connected to the sensor node 22 through local communication between the sensor node 22 and the mobile terminal 25. In the case where the data of video contents to be replayed is set for a video player that is connected to the sensor node 22, for example, the same procedure as in the above-described sequence can be used.

Here, the scale of IoT communication systems is assumed not only to one where the number of devices to be managed is limited to approximately 1,000, but also to one where the number is 1,000,000 or greater. Accordingly, it is necessary to establish an efficient and safe communication means not only for the sensor network communication, but also for all communication that includes local communication vis-à-vis the sensor node in the communication system using the sensor network. Therefore, the present invention is appropriate for the IoT communication systems.

Though the present invention is described above in detail, the present invention is not limited to the above-described configurations, and needless to say, the present invention may be implemented with a configuration other than the above.

It is also possible for the present invention to be provided as a method or a system for implementing the process according to the present invention, a program for implementing such a method or system by means of a computer having hardware resources such as a processor and a memory or a recording medium that stores such a program.

INDUSTRIAL APPLICABILITY

The present invention can be applied to a communication system that is provided with a sensor node for acquiring sensing data from a sensor and a server that is connected to the sensor node via sensor network communication.

REFERENCE SIGNS LIST

10: server
11: operator terminal
12: sensor node
120: sensor group
13: sensor network base station
14: gateway
15: mobile terminal
20: server
21: operator terminal
22: sensor node
220: sensor group
23: sensor network base station
24: gateway
25: mobile terminal
26: mobile line base station
27: gateway

The invention claimed is:

1. A communication system comprising:
a sensor node that acquires sensing data from a sensor and a server that is connected to the sensor node via sensor network communication;
wherein
the communication system further comprises a mobile terminal that is connected to the server via mobile line communication and can be connected to the sensor node through local communication;
the mobile terminal has a mobile terminal key pair, which is a pair of a private key of itself and a public key;
the sensor node has a sensor node key pair, which is a pair of a private key of itself and a public key;
the public key of the sensor node key pair is transmitted from the sensor node to the server via the sensor network communication, and furthermore is transmitted from the server to the mobile terminal via the mobile line communication;
the public key of the mobile terminal key pair is transmitted from the mobile terminal to the sensor node through the local communication; and
the sensor node and the mobile terminal generate a common key by combining the private key of itself and the public key of the counterpart so as to encrypt the local communication by using the common key;
wherein
the mobile terminal transmits a connection request to the sensor node through the local communication;
the sensor node generates a challenge code in response to the connection request;
the challenge code is transmitted from the sensor node to the mobile terminal through the local communication, and further transmitted from the mobile terminal to the server via the mobile line communication;
the server generates a response code that corresponds to the received challenge code;
the response code is transmitted from the server to the mobile terminal via the mobile line communication, and further transmitted from the mobile terminal to the sensor node through the local communication; and
the sensor node confirms the response code that has been generated by the server in response to the challenge code and continues the local communication with the mobile terminal in the case where the response code is appropriate.

2. The communication system according to claim 1, wherein
the mobile terminal further has a first encryption key;
the sensor node further has a second encryption key with which it is possible to decode data that has been encrypted by using the first encryption key; and
the public key of the mobile terminal key pair is encrypted in the mobile terminal by using the first encryption key, transmitted from the mobile terminal to the sensor node through the local communication, and can be decoded in the sensor node by using the second encryption key.

3. The communication system according to claim 1, wherein
the sensor node is provided with a random number generator that generates a random number on the basis of the sensing data so as to generate the sensor node key pair by using the random number that has been generated by the random number generator for each session of the local communication.

4. The communication system according to claim 1, wherein
the sensor node calculates a hash value of the data that has been received through the encrypted local communication and transmits the hash value to the server through the sensor network communication; and
the server verifies the correctness of the data on the basis of the hash value that has been received from the sensor node.

5. The communication system according to claim 1, wherein
- the sensor node has a key pair for sensor node authentication, which is a pair of a private key for authenticating itself and a public key;
- the server has a sensor node certificate which is a certificate issued for the public key of the key pair for sensor node authentication; and
- the mobile terminal receives the sensor node certificate from the server via the mobile line communication when starting the local communication with the sensor node, confirms the correctness and validity of the sensor node certificate by means of a root certificate of itself, and continues the local communication with the sensor node in the case where the sensor node certificate is correct and valid.

6. The communication system according to claim 1, wherein
- the sensor node further has a third encryption key;
- the server further has a fourth encryption key with which it is possible to decode the data that has been encrypted by using the third encryption key; and
- the challenge code is encrypted in the sensor node by using the third encryption key, transmitted from the sensor node to the mobile terminal through the local communication, and furthermore, transmitted from the mobile terminal to the server via the mobile line communication and decoded in the server by using the fourth encryption key.

7. The communication system according to claim 6, wherein
- the sensor node further has a fifth encryption key and a sixth encryption key with which it is possible to decode the data that has been encrypted by using the fifth encryption key;
- the fifth encryption key is encrypted in the sensor node by using the third encryption key together with the challenge code, transmitted from the sensor node to the mobile terminal through the local communication, and furthermore, transmitted from the mobile terminal to the server via the mobile line communication, and decoded in the server by using the fourth encryption key; and
- the response code is encrypted in the server by using the fifth encryption key, transmitted from the server to the mobile terminal via the mobile line communication, and furthermore, transmitted from the mobile terminal to the sensor node through the local communication, and decoded in the sensor node by using the sixth encryption key.

8. The communication system according to claim 1, wherein
- the sensor node is provided with a random number generator that generates a random number on the basis of the sensing data so as to generate the challenge code by using the random number that has been generated by the random number generator for each session of the local communication.

* * * * *